United States Patent [19]

Hausch et al.

[11] Patent Number: 5,906,773
[45] Date of Patent: *May 25, 1999

[54] LIQUID DISTRIBUTOR

[75] Inventors: Gail W. Hausch, Clinton; Douglas S. Byrd, Mogadore, both of Ohio

[73] Assignee: Norton Company, Worcester, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/902,823

[22] Filed: Jul. 30, 1997

[51] Int. Cl.$^6$ ........................................ B01F 3/04
[52] U.S. Cl. .............................. 261/97; 239/193; 261/110
[58] Field of Search .............................. 261/74, 97, 110, 261/DIG. 44; 239/193, 524

[56] References Cited

U.S. PATENT DOCUMENTS

| | | | |
|---|---|---|---|
| 3,290,025 | 12/1966 | Engalitcheff, Jr. ...................... | 261/110 |
| 3,937,769 | 2/1976 | Strigle, Jr. et al. .............. | 261/DIG. 44 |
| 4,264,538 | 4/1981 | Moore et al. .................... | 261/DIG. 44 |
| 4,729,857 | 3/1988 | Lee et al. .................................. | 261/97 |
| 4,816,191 | 3/1989 | Berven et al. ............................ | 261/97 |
| 4,855,089 | 8/1989 | Michels ..................................... | 261/97 |
| 4,981,265 | 1/1991 | Buhlmann ................................ | 261/97 |
| 5,439,620 | 8/1995 | Maeda .............................. | 261/DIG. 44 |

FOREIGN PATENT DOCUMENTS

| | | | |
|---|---|---|---|
| 2945103 | 5/1981 | Germany ................................. | 261/97 |

*Primary Examiner*—C. Scott Bushey
*Attorney, Agent, or Firm*—David Bennett

[57] ABSTRACT

Significant savings of space inside a mass transfer tower can be obtained by use of a liquid distributor system with efficient uniform distribution from conduits such as troughs, pipes or deck distributors using flow spreader devices located predominantly below the conduit enabling closer spacing of liquid distribution points within the tower.

10 Claims, 5 Drawing Sheets

LIQUID DISTRIBUTOR

BACKGROUND OF THE INVENTION

This invention relates to internal structures, often referred to as "liquid distributors", that are used in vessels employed in chemical plant and oil refineries for mass transfer and heat transfer applications such as distillation, fractionation, absorption, scrubbing, contacting, stripping and quenching.

In such towers the liquid is typically caused to flow down the tower so as to be contacted with vapors flowing counter-current up the tower. This contact tower can often have a plurality of segments, each comprising a distributor system and packing, located sequentially in the same tower.

It is frequently advantageous that the liquid flow in such segments is in thin film fashion so as to maximize the degree and time of contact with the liquid. This can be accomplished for example by providing that the segments comprise structured or random packing elements over which the liquid streams leaving the distributor pass in thin film flow fashion. Other methods of bringing about the contact are known in the art.

All these methods result in liquid arriving at the bottom of the segment of the tower containing such contacting structures where it needs to be collected. Typically this is done by a series of collector devices which then channel liquid to distributor conduits from which it may again be passed down the next lower segment of the mass transfer tower. Similar distribution structures are located at the top of the towers at the point at which the liquid is introduced.

In each case it is important that the liquid be evenly distributed throughout the cross-section of the tower so as to maximize the vapor/liquid contact potential created by the packing elements and to prevent uneven treatment of the liquid and/or vapor passing through the device. To this end the distribution structures usually comprise distributor conduits, such as troughs, feeding branch conduits which themselves have apertures in the walls through which a flow of liquid can be directed to the top levels of the packing.

It would obviously be possible to multiply the number of apertures in the branch trough walls to enhance the development of complete and expeditious wetting of the packing elements in an overall uniform manner. This would however mean that the apertures would need to be relatively small to ensure that each received an equal amount of liquid for distribution. Unfortunately small holes are more subject to obstruction by solid impurities in the liquid flow and this results in exactly the uneven flow that is to be avoided.

It is well-known to attack this problem by using relatively fewer holes that are bigger and using devices for spreading out the flow from each hole such that it reaches the packing as a plurality of drips. This is done by contacting the liquid flow exiting horizontally from each aperture with a vertical surface that spreads the flow and terminates in a plurality of drip edges or points that contact the top surfaces of the packing. Suitable devices are described for example in U.S. Pat. Nos. 4,264,538; 4,816,191; and 4,855,089. Such devices typically place a spreader plate opposite the aperture in the conduit wall such that the exiting liquid hits the plate and is spread in a relatively thin flow which then passes to drip edges or fingers. This approach can have drawbacks in that the location of the plate necessarily limits the proximity of adjacent conduits. In addition a partially blocked aperture could reduce the flow to the extent that the liquid flow would not even reach the plate. Also if the flow is particularly strong the position of the plate may have to be adjusted to avoid splashing or guards provided to ensure that the flow is channeled in the desired direction.

In another device marketed commercially by Hydronyl Ltd in the United Kingdom in the early 1970's a liquid flow was distributed by closed conduits with a plurality of apertures at opposite ends of a horizontal diameter or chord set at an appropriate depth. The liquid in the conduit exited through the holes and into contact with a vertical sheet metal spreader plate with a lower portion that conducted the liquid film formed on the plate to a vertical perforated plate directly below the pipe such that the liquid ran down both sides of the perforated plate. In a preferred form the vertical perforated plate then contacted a similar vertical perforated plate set at right angles to the first. This acted to spread a portion of the liquid at right angles to the rest of the flow and thereby enhance the uniformity of distribution across the packing to which the down-flowing liquid was ultimately fed. This arrangement worked well but was subject to many of the problems discussed above.

In yet another prior art system the conduit has the form of a deck provided with risers through which gas can flow upwards and a plurality of holes through which down-flowing liquid can pass. This eliminates the spacing problem but delivers the liquid in streams rather than from drip points which are more effective in promoting uniform flow through the system.

The present invention provides a novel and advantageous alternative to such devices. It has the advantage of permitting the use of relatively large holes that would minimize blocking while at the same time permitting very wide and even distribution of the flow under a wide range of flow conditions.

GENERAL DESCRIPTION OF THE INVENTION

The present invention provides a liquid distributor system comprising a liquid distribution conduit having a plurality of liquid distribution apertures and, attached directly to the conduit, a conductor tube adapted to receive a flow of liquid exiting the conduit through the aperture and conduct it to a spreader plate, located at least partially below the level of the conduit, which is inclined at an angle to the horizontal that is 75° or less. The spreader plate is preferably angled at from 70° to 10°, and more preferably from 60° to 40°, to the horizontal. The degree of tilt to the horizontal is dictated largely by the rate of flow and therefore the degree to which it can be spread before reaching the drip points. Clearly the maximum spreading is desired and this often means that a lower angle of inclination to the horizontal within the above range is preferred.

The liquid distribution device forming part of this invention is described as a "conduit" and it is to be understood that this term includes any means of delivering a flow of liquid to a series of apertures in the body of the conduit. This could be in the form of an open trough or closed pipe of any desired cross-section, providing it fulfills the function of distributing liquid flowing therein by means of the apertures referred to above. The conduit can also be in the form of a deck distributor wherein a liquid flows across the deck and exits through apertures actually in the floor of the deck. In this case the "conductor tube" is provided by the passage through the thickness of the deck itself.

In some cases it is desirable to provide that the surface of the spreader plate is textured to slow down the flow and aid in the spreading. One plate extending the length of the conduit can be used to handle the liquid exiting all the conductor tubes associated with a conduit. Alternatively but often less desirably, each conductor tube can have its own individual spreader plate. Where such individual spreader plates are provided each plate is preferably fan-shaped to accomodate the spread of liquid flowing over it.

Where the rate of liquid flow is relatively low, that is 3 gallons per minute per square foot, (0.12 m³ per minute per m²), and particularly below 2 gallons per minute per square foot, (0.08 m³ per minute per m²), it is preferred that the spreader plate terminates in an edge from which a thin film of liquid is discharged. Alternatively and often preferably the edge is replaced by a number of drip points delivering the liquid in controlled manner to packing located below.

A spreader plate which terminates in a vertical extension member which has a drip edge or drip points at the lower extremity is often preferred. This vertical extension member can also be perforated to allow liquid passing across its surface also to pass through the thickness of the plate. Drip points can be provided in such a perforated plate by providing that the bottom edge passes through a multiplicity of such perforations. Drip points can also be provided by finger extensions from the bottom edge of the member. This arrangement has the potential advantage of spreading the liquid in a band thicker than the width of the plate itself by deforming the fingers out of the plane of the plate.

The above structures are however increasingly less effective as the flow rate exceeds about 3 gallons per minute per square foot, (0.12 m³ per minute per m²), and in such cases it is preferred that the spreader plate feed the liquid into a secondary trough having a plurality of liquid distribution means such as holes, slots, weirs, notches or other apertures.

The secondary trough preferably comprises opposed containment walls joined by a bottom member and the liquid distribution means are preferably provided along the lower portion of at least one of the walls. This has the effect of ensuring a uniform flow rate through all of the means in the secondary trough even when the throughput capacity of the conductor tube/spreader plate arrangement for efficient operation is exceeded.

The secondary trough can be totally separate from the spreader plate and this may be desirable if the secondary trough is installed as a retrofit expedient to handle increased capacity requirements. However when the liquid distributor system is designed from the beginning for high capacity systems, it is convenient to provide that the vertical extension of the spreader plate forms one of the walls of the secondary trough.

The secondary trough is conveniently mounted directly below the conduit. This can be done by providing an extension of one wall of the secondary trough which is attached directly to the conduit along at least a portion of its length.

The spreader plate is preferably provided with a weir at a point intermediate between the point at which the liquid flow contacts the plate and the vertical section, (where one is provided, otherwise the lower end of the plate), and at right angles to the direct line formed by a continuation of the line of the conductor tube across the spreader plate. The function of the weir is to interrupt the flow across the spreader plate and enhance the spreading effect. The height of the weir can be constant across the spreader plate but often it is desirable to provide that it is highest along the fall-line of the sloping spreader plate and smallest at the extremities. Alternatively and often preferably, the weir can be notched such that spaced portions of its length have reduced height so as to allow more liquid over the weir at that point. The weir can extend across the full width of the spreader plate but more usually it terminates short of the edge of the spreader plate on both sides.

The conductor tube can have a conventional form where the side of the conduit provides a portion of the wall of the tube and a suitably configured member attached to the side of the trough provides a tube of uniform cross-section from the aperture in the wall of the conduit to the point of discharge on to the spreader plate. This cross section therefore can be for example square, rectangular or basically circular with one portion of the circumference flattened. It can however also have a non-typical cross-section defining two or more channels within the tube. These channels can, but need not, be totally separated but should preferably be sufficiently distinct to ensure that the liquid volume delivered from the end of the tube on to the spreader plate is non-uniform across the width of the tube. Such a tube could have, for example, a cross-section somewhat like a letter "B". This has the property of initiating the spreading by forming an at least partially divided flow actually within the conductor tube.

In use it is often desirable to provide that the bottom end of the spreader plate or any vertical extension member attached thereto be anchored to the top of the packing to prevent relative movement in response to pressure differences and variations. The anchoring device is commonly called a "hold-down bar" and can take any desired functional shape.

DESCRIPTION OF PREFERRED EMBODIMENTS

The invention is now described with particular reference to the Drawings which are intended to illustrate the invention but not to imply any necessary limitations on the scope thereof.

Figure 1:
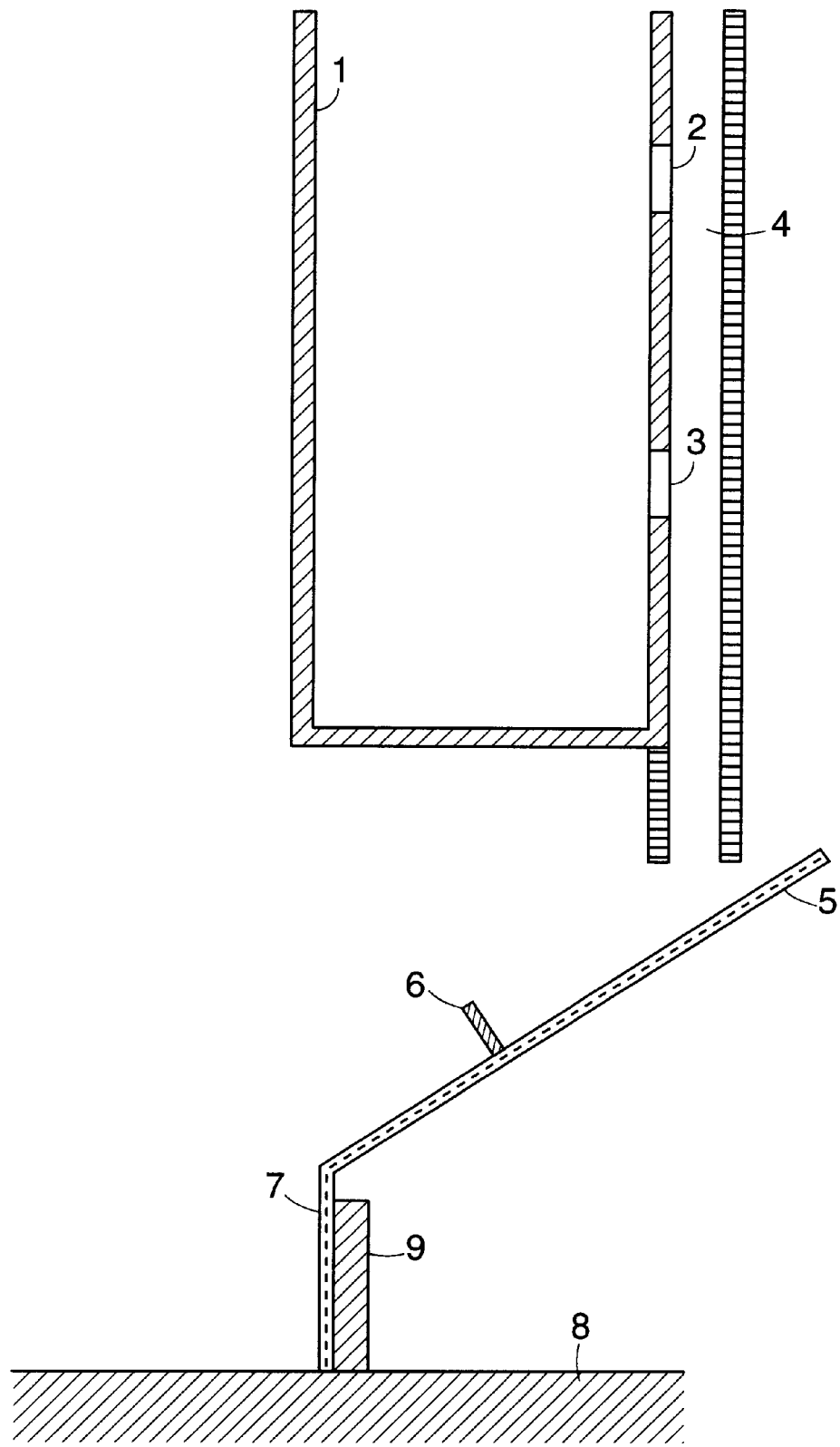
FIG. 1 shows a diagrammatic cross-section of a trough system according to the invention.

In FIG. 1 a conduit trough with a rectangular cross-section is provided with two outlet apertures, 2, and 3. The uppermost aperture, 2, is intended only for use in overflow situations or if the lower apertures become obstructed. The lower aperture is the main vehicle by which liquid in the trough is to be distributed. The apertures shown are circular but in fact any suitable configuration can be adopted. Often tear-shaped apertures are preferred because these are less susceptible to becoming blocked. The trough will typically have many holes but only two are shown in this figure for the sake of simplicity.

In use liquid exits the trough through the holes and passes into the conductor tube, 4, from which it discharges on to an inclined spreader plate, 5, where it spreads as it flows down the plate until it meets a weir, 6, which further enhances the spreading. Downward flowing liquid then contacts a vertical extension member, 7, which is preferably textured or even apertured. The extension member is anchored to packing structures, 8, by means of a hold-down bar, 9. The lower end of the plate, 7, is provided with a plurality of drip points by which down flowing liquid may be distributed on to the packing.

Figure 2A:
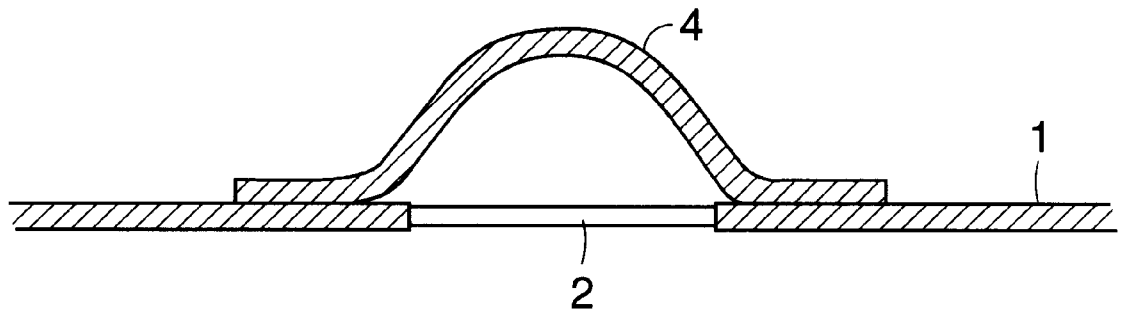
FIGS. 2A and 2B show two alternative configurations of conductor tube in cross-section.
Figure 2B:
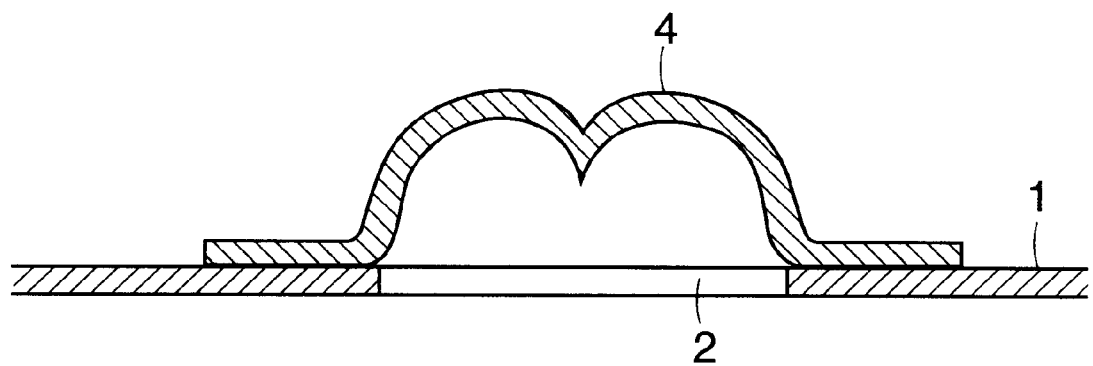

FIG. 2A shows the design of the conductor tube used in FIG. 1 in cross-section. As can be seen the tube, 4, is formed by an arched member which is attached to the side of the trough, 1, over the aperture, 2. FIG. 2B shows the design of conductor tube used in FIG. 3. This tube has the "B" shaped cross-section that allows the liquid flow to be split into two flows as it exits the aperture in the trough.

Figure 3:
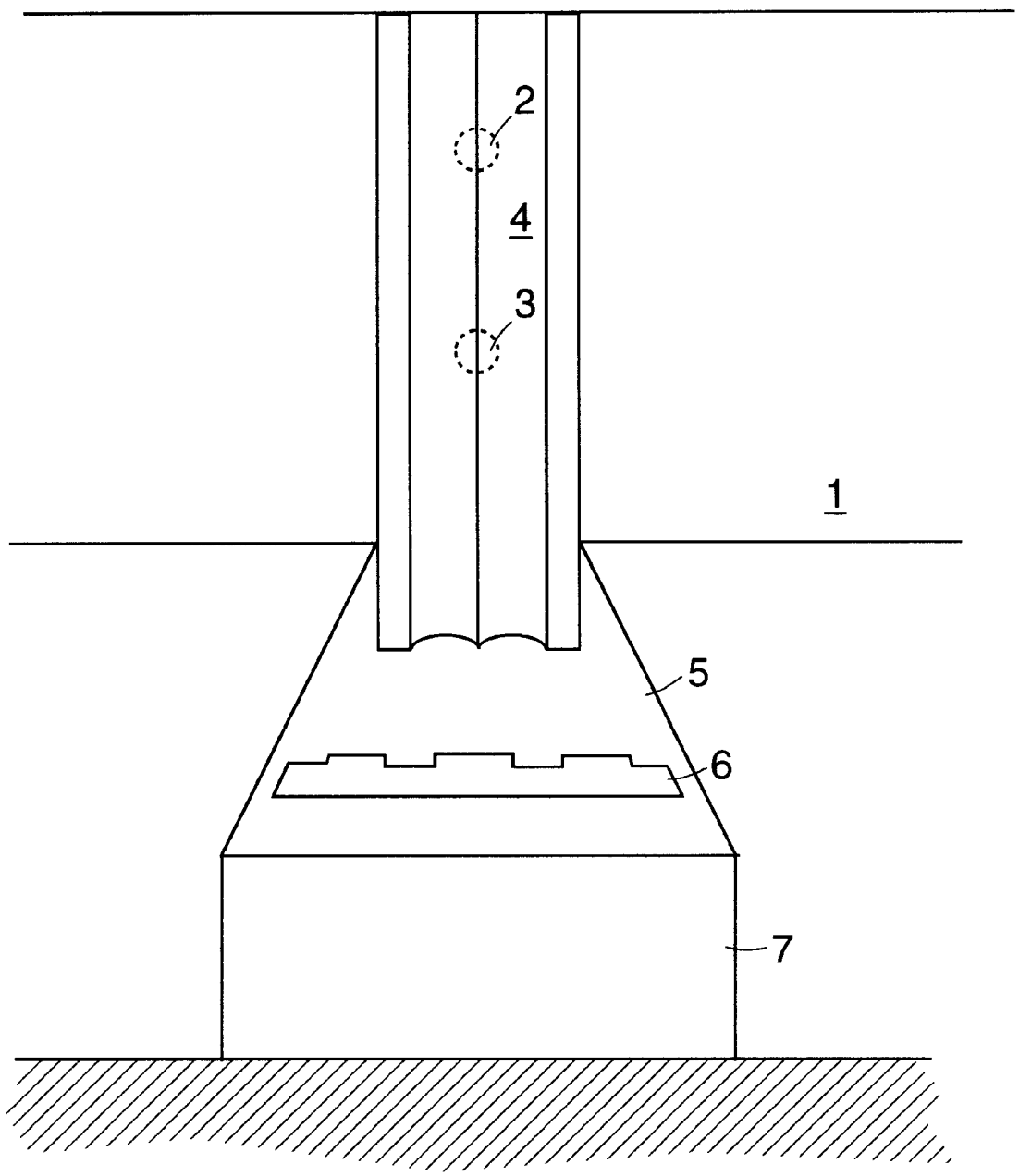
FIG. 3 shows a side view of a trough system according to the invention with a channel tube as shown in FIG. 2B.

In FIG. 3 the conductor tube, 4, has a "B" shaped cross-section. Liquid passing through the conductor tube into contact with the inclined spreading plate, 5, spreads and contacts a notched weir, 6. In other respects the structure is very similar to that illustrated in FIG. 1.

Figure 4:
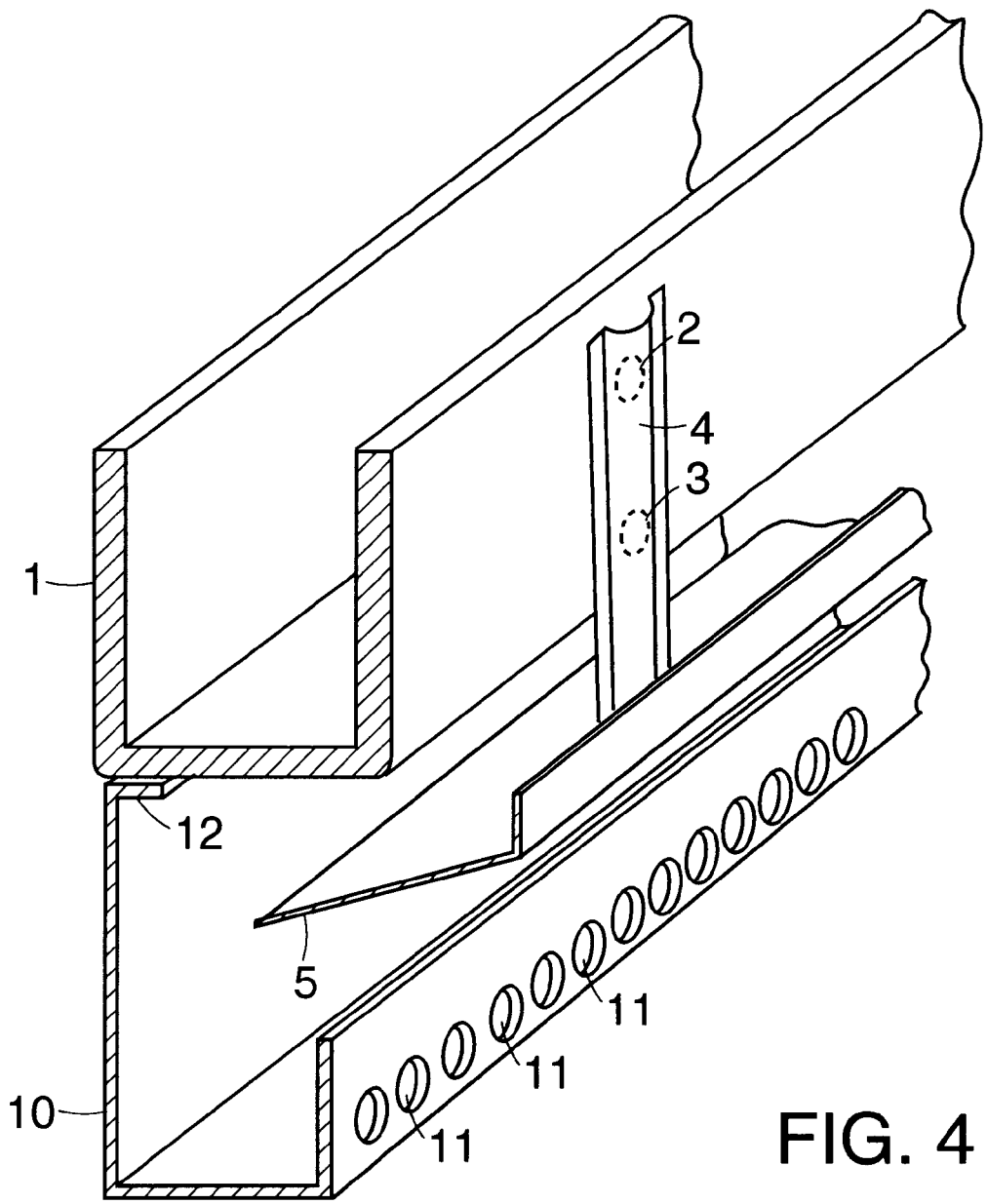
FIG. 4 shows a perspective view, which is partly in cross-section, of an alternative configuration embodying a secondary trough.

In FIG. 4 a design intended for use with higher flow rates is illustrated. The conduit, the apertures, the conductor tube and the spreader plate are as shown in the previous Figures but in this case the spreader plate feeds into a secondary trough, 10, provided with holes, 11, along the lower portion of at least one of the walls. As indicated above these holes can be replaced or supplemented with slots, weirs and/or notches. The secondary trough is attached to the conduit by a bracket extension, 12, on one of the walls of the trough.

Figure 5:
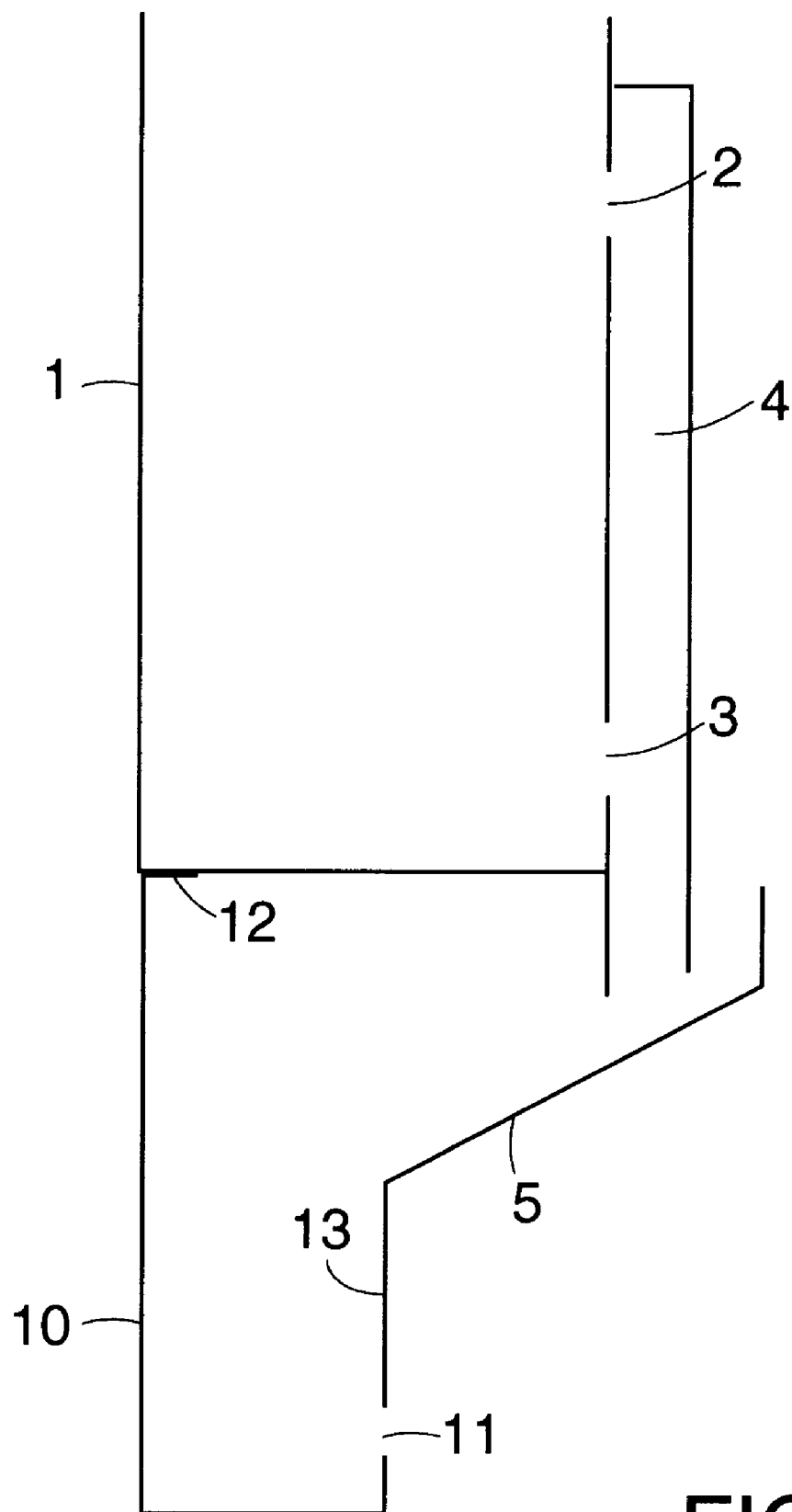
FIG. 5 is a diagrammatic cross-section showing a variation of the embodiment shown in FIG. 4 in which the vertical extension of the spreader plate provides one wall of the secondary trough.

FIG. 5 shows a diagrammatic sketch of a variation on the embodiment shown in FIG. 4 in which the spreader plate has a vertical extension, 13, which provides one of the walls of the secondary trough.

Many variations on the structures described above are possible without departing from the essential structure of the present invention. For example it is possible to replace the conductor tubes shown in the drawings with a separate tube attached over the aperture in the side of the conduit. It is preferable that the diameter of the tube be substantially larger than the aperture to ensure that flow remains free rather than constricted. Another variation is possible in the cross-sectional shape of the conduit. In the drawings the cross-section is rectangular but there is no requirement that would make other cross-sections, such as round or V-shaped, unsuitable. It can also be open or closed.

What is claimed is:

1. A liquid distributor system comprising a conduit having a plurality of liquid distribution apertures and, attached directly to a wall of the conduit, a plurality of conductor tubes each adapted to receive a flow of liquid exiting the conduit through vertically aligned apertures and discharge it directly on to an angled spreader plate located at least partially below the conduit and inclined at an angle below the horizontal that is not more than 75° such that a liquid exiting the conduit is spread into a relatively thin flow.

2. A system according to claim 1 in which the spreader plate is inclined at an angle of from 10 to 70° to the horizontal.

3. A system according to claim 1 in which the spreader plate is provided with a weir.

4. A system according to claim 1 in which the spreader plate is provided across the width of its lower extremity with a downwardly extending vertical extension member.

5. A system according to claim 4 in which the vertical extension of the spreader plate terminates in a plurality of drip fingers.

6. A system according to claim 1 in which the spreader plate terminates in a plurality of drip fingers.

7. A system according to claim 1 in which the spreader plate terminates in a lower edge located above a secondary trough comprising containment walls provided with a plurality of distribution holes in at least one of the containment walls.

8. A system according to claim 4 in which the vertical extension of the spreader plate provides a containment wall of a secondary trough provided with a plurality of distribution means in at least one containment wall of the secondary trough.

9. A system according to claim 1 in which the conductor tube has a cross section defining at least two interior channels within the tube.

10. A system according to claim 1 in which the conductor tube is attached to the side of the conduit.

* * * * *